United States Patent
Hanaoka et al.

(10) Patent No.: US 6,496,394 B2
(45) Date of Patent: Dec. 17, 2002

(54) UNINTERRUPTIBLE POWER SYSTEM

(75) Inventors: Hiroyuki Hanaoka; Masahiko Nagai; Minoru Yanagisawa, all of Toshima-ku (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 09/968,381

(22) Filed: Oct. 1, 2001

(65) Prior Publication Data

US 2002/0039302 A1 Apr. 4, 2002

(30) Foreign Application Priority Data

Sep. 29, 2000 (JP) ........................................ 2000-301513

(51) Int. Cl.[7] .......................................... H02M 7/5395
(52) U.S. Cl. ........................................................ 363/71
(58) Field of Search ...................... 363/65, 71; 307/43, 307/64, 66, 82

(56) References Cited

U.S. PATENT DOCUMENTS

| | | | | |
|---|---|---|---|---|
| 4,677,535 A | * | 6/1987 | Kawabata et al. | ............. 363/65 |
| 5,262,935 A | * | 11/1993 | Shirahama et al. | ............ 363/71 |
| 5,272,612 A | * | 12/1993 | Harada et al. | ................. 363/8 |
| 5,446,645 A | * | 8/1995 | Shirahama et al. | ............ 363/71 |
| 5,473,528 A | * | 12/1995 | Hirata et al. | .................. 363/71 |
| 6,212,081 B1 | * | 4/2001 | Sakai | ........................... 363/71 |
| 6,381,156 B1 | * | 4/2002 | Sakai et al. | ..................... 363/65 |
| 6,396,170 B1 | * | 5/2002 | Laufenberg et al. | .......... 307/64 |

FOREIGN PATENT DOCUMENTS

JP  02-101932  4/1990

* cited by examiner

*Primary Examiner*—Adolf Deneke Berhane
(74) *Attorney, Agent, or Firm*—Rankin, Hill, Porter & Clark LLP

(57) ABSTRACT

A parallel operation-type uninterruptible power system capable of preventing one of uninterruptible power systems from being extremely increased in load sharing ratio without having to operate each uninterruptible power system while watching operation of the remaining uninterruptible power systems. The uninterruptible power systems each are constituted by an inverter circuit and an inverter circuit control device. The inverter circuit control device includes a PWM control signal generating means. The PWM control signal generating means generates a PWM control signal so as to gradually reduce an output voltage of the inverter circuit as supply active power increases and until a judging means judges that the supply active power has reached a predetermined level and so as to reduce the output voltage at a reduction ratio increased as compared with before to keep it from falling into an overload condition when the judging means judges that the supply active power has reached the predetermined level.

5 Claims, 4 Drawing Sheets

UNINTERRUPTIBLE POWER SYSTEM

BACKGROUND OF THE INVENTION

This invention relates to an uninterruptible power system, a parallel operation-type uninterruptible power system, an inverter unit and a parallel operation-type inverter unit.

Of conventional uninterruptible power systems, a so-called continuous inverter-type uninterruptible power system is constructed so as to convert AC power provided by an AC power supply into DC power to output it to a load when the commercial power supply is in a normal condition and so as to convert DC power provided by a storage battery into AC power to output it to the load when power failure occurs in the commercial power supply. The uninterruptible power system includes an inverter circuit for power conversion constituted by a semiconductor switching element, as well as an inverter circuit control device including a PWM control signal generating means for generating a PWM control signal which subjects the semiconductor switching element to PWM control to permit AC power synchronized with commercial power to be outputted from the inverter circuit while adjusting an output power thereof. When an increase in capacity is required, a plurality of such uninterruptible power systems are connected in parallel to each other for operation. In addition to the uninterruptible power systems, a plurality of inverters for driving such as motors or the like may be subjected to parallel operation. In parallel operation of the plural inverters, an extreme increase in load sharing ratio of each of the inverters may possibly causes breakage of the inverter. Also, it causes actuation of a safety circuit, leading to a failure in parallel operation of the inverters.

Parallel operation of the plural uninterruptible power systems causes a drift current to occur in a reactive current when the uninterruptible power systems are different in output voltage from each other. Also, the parallel operation causes a drift current to occur in an active current as well, when output currents of the power units are different in phase from each other. Thus, the prior art is constructed so as to permit the uninterruptible power system to equitably share power by extracting both a reactive current and an active current from an output current of each of the uninterruptible power systems to vary an amplitude of an output voltage thereof depending on a variation in reactive current and vary a phase of the output voltage depending on a variation in active current. Alternatively, in the prior art, equitable feeding of power to the plural uninterruptible power systems is carried out by detecting a sum of currents of the plural uninterruptible power systems fed to the load to compare the sum with a current of each of the uninterruptible power systems, resulting in carrying out control so as to permit the current to be an average of the plural uninterruptible power systems.

Japanese Patent Publication No. 40704/1994 discloses techniques of subjecting a plurality of inverters connected in parallel to each other to parallel operation, wherein an output of a differential amplifying circuit for amplifying a differential voltage between an output voltage of the inverter and a sinusoidal reference wave is used for controlling the inverters. A means for adding or subtracting an output current of the inverter to or from an input of the differential amplifying circuit or an output thereof is provided. Thus, when it is desired to reduce an output voltage of the inverter, the output current of the inverter is added to the sinusoidal reference wave from a sinusoidal wave generating circuit and then fed to the differential amplifying circuit together with the output voltage of the inverter. When it is desired to increase the output voltage, the output current and the output voltage are added thereto and are fed to the differential amplifying circuit together with the sinusoidal reference wave, resulting in controlling a drift current between the inverters. The parallel operation thus constructed permits each of the inverters to solely carry out controlling of a drift current thereof without considering outputs of the remaining inverters.

However, the prior art wherein parallel operation of the plural uninterruptible power systems connected in parallel to each other requires operation of each of the power failure-free power units depending on outputs of the remaining uninterruptible power systems, so that it is required to prepare or arrange any additional circuit for associating the uninterruptible power systems with each other. Thus, mere parallel connection of the plural uninterruptible power systems to each other fails in satisfactory operation of the uninterruptible power systems. The above-described approach disclosed in Japanese Patent Publication No. 40704/1994 fails to prevent an extreme increase in load sharing of each of the inverters although it controls the drift current.

SUMMARY OF THE INVENTION

The present invention has been made in view of the foregoing disadvantages of the prior art.

Accordingly, it is an object of the present invention to provide a parallel operation-type uninterruptible power system which is capable of preventing an extreme increase in load sharing of each of uninterruptible power systems constituting the parallel operation-type uninterruptible power system without requiring to operate each of the uninterruptible power systems while considering operation of the remaining uninterruptible power systems.

It is another object of the present invention to provide an uninterruptible power system which is capable of being used for the above-described parallel operation-type uninterruptible power system.

It is a further object of the present invention to provide a parallel operation-type inverter unit which is capable of preventing an extreme increase in load sharing of each of inverter units without requiring to operate each of the inverter units while considering operation of the remaining inverter units.

It is still another object of the present invention to provide an inverter unit which is capable of being used for the above-described parallel operation-type inverter unit.

In accordance with one aspect of the present invention, an uninterruptible power system is provided. The uninterruptible power system includes an inverter circuit for converting DC power converted from AC power of a commercial power supply into AC power to output it to a load when the commercial power supply is in a normal condition and converting DC power of a storage battery into AC power to output it to the load when the commercial power supply falls into a power failure condition. The inverter circuit is constituted by semiconductor switching elements. The uninterruptible power system also includes an inverter circuit control device including a voltage detecting means for detecting an output voltage of the inverter circuit, a current detecting means for detecting an output current of the inverter circuit, and a PWM control signal generating means for generating a PWM control signal for subjecting the semiconductor switching elements constituting the inverter circuit to PWM control to permit the inverter circuit to output the AC power synchronized with commercial power supply while adjusting an output voltage thereof. The PWM control signal generating means includes a differential amplifying circuit for amplifying a difference between the output voltage and a sinusoidal reference signal and is constructed so as to generate the PWM control signal depending on a signal obtained by adding or subtracting the output current to or from an input or output of the differential amplifying circuit in such a manner that the output current is subtracted from the sinusoidal reference signal.

In the present invention generally constructed as described above, the inverter circuit control device further includes an operation means for operating a supply active power being fed to the load by the inverter circuit depending on the output voltage and output current and a judging means for judging whether the supply active power operated by the operation means reaches a predetermined level before it falls into an overload condition. Also, the PWM control signal generating means generates the PWM control signal so as to gradually reduce the supply active power or gradually reduce the output voltage of the inverter circuit as supply active power increases and until the judging means judges that the supply active power reaches the predetermined level and so as to reduce the output voltage at a reduction ratio increased as compared with before to keep it from falling into the overload condition when the judging means judges that the supply active power reaches the predetermined level. Such construction of the present invention, when the uninterruptible power systems are operated while being connected in parallel to each other, permits an initial load sharing ratio of each of the uninterruptible power systems to be determined depending on a magnitude of an output voltage thereof determined depending on construction thereof. More specifically, the uninterruptible power system increased in output is increased in load sharing ratio. Such a condition causes occurrence of a drift current due to a difference between the output voltages of the uninterruptible power systems. However, the drift current does not adversely affect operation of the uninterruptible power system unless it is extremely or abnormally increased. A problem due to the drift current may be solved by techniques disclosed in Japanese Patent Publication No. 40704/1994 owned by the assignee. In order to permit the disclosed techniques to be applied to the present invention, the PWM control signal generating means includes the differential amplifying circuit for amplifying a difference between the output voltage and a sinusoidal reference signal and is constructed so as to generate the PWM control signal depending on a signal obtained by adding or subtracting the output current to or from an input or output of the differential amplifying circuit in such a manner that the output current is subtracted from the sinusoidal reference signal.

Thus, the present invention permits controlling of the drift current during normal operation of the uninterruptible power system. However, when a load sharing ratio of the uninterruptible power system increased in load sharing ratio is increased to a level of the overload condition, the uninterruptible power system is caused to be broken. In order to avoid such a trouble, the present invention is constructed in such a manner that the PWM signal generating means generates the PWM control signal so as to gradually reduce the output voltage of the inverter circuit as supply active power increases and until the judging means judges that the supply active power reaches a predetermined level and so as to reduce the output voltage at a reduction ratio increased as compared with before to keep it from falling into the overload condition when the judging means judges that the supply active power reaches the predetermined level. Such construction, when one of the uninterruptible power systems is reduced in output voltage, permits another uninterruptible power system most increased in output voltage to be increased in load sharing ratio, so that the above-described control may be carried out in the remaining uninterruptible power systems. When it is not required to substantially reduce the output voltage in the remaining uninterruptible power systems, the parallel operation is continued. Thus, the present invention permits each of the uninterruptible power systems to vary its load sharing ratio by itself without monitoring outputs of the remaining uninterruptible power systems, to thereby prevent any one of the uninterruptible power systems from falling into an overload condition. This results in the uninterruptible power systems being subjected to parallel operation without requiring any circuit for associating the uninterruptible power systems with each other.

In this instance, the PWM control signal generating means may be constructed so as to subtract a value obtained by multiplying the supply active power by a first gain constant from an effective value command value for an output voltage to be obtained before the judging means judges that the supply active power reaches the predetermined level and to subtract a value obtained by multiplying the power factor by a second gain constant larger than the first gain constant from the effective value command value for the output voltage to be obtained when the judging means judges that the supply active power reaches the predetermined level.

Also, in accordance with another aspect of the present invention, an inverter circuit is provided. The inverter unit includes an inverter circuit for converting AC power of a commercial power supply into DC power to output it to a load. The inverter circuit is constituted by semiconductor switching elements. The inverter unit also includes an inverter circuit control device including a voltage detecting means for detecting an output voltage of the inverter circuit, a current detecting means for detecting an output current of the inverter circuit, and a PWM control signal generating means for generating a PWM control signal for subjecting the semiconductor switching elements constituting the inverter circuit to PWM control to permit the inverter circuit to output the AC power synchronized with commercial power while adjusting an output voltage thereof. The PWM control signal generating means includes a differential amplifying circuit for amplifying a difference between the output voltage and a sinusoidal reference signal with each other and is constructed so as to generate the PWM control signal depending on a signal obtained by adding or subtracting the output current to or from an input or output of the differential amplifying circuit in such a manner that the output current is subtracted from the sinusoidal reference signal.

In the inverter unit of the present invention generally constructed as described above, the inverter circuit control device further includes an operation means for operating a supply active power being fed to the load by the inverter circuit depending on the output voltage and output current and a judging means for judging whether the active power operated by the operation means reaches a predetermined level before it falls into an overload condition. Also, the PWM control signal generating means generates the PWM control signal so as to gradually reduce the supply active power or gradually reduce the output voltage of the inverter circuit with an increase in the supply active power until the judging means judges that the supply active power reaches the predetermined level and so as to reduce the output voltage at a reduction ratio increased as compared with before to keep it from falling into the overload condition when the judging means judges that the supply active power has reached the predetermined level.

A plurality of the inverter units may be connected in parallel to each other to constitute a parallel operation-type inverter unit. The parallel operation-type inverter unit carries out parallel operation without requiring any circuit for associating the inverter units with each other for such reasons as described above.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Now, the present invention will be described with reference to the accompanying drawings.

Figure 1:
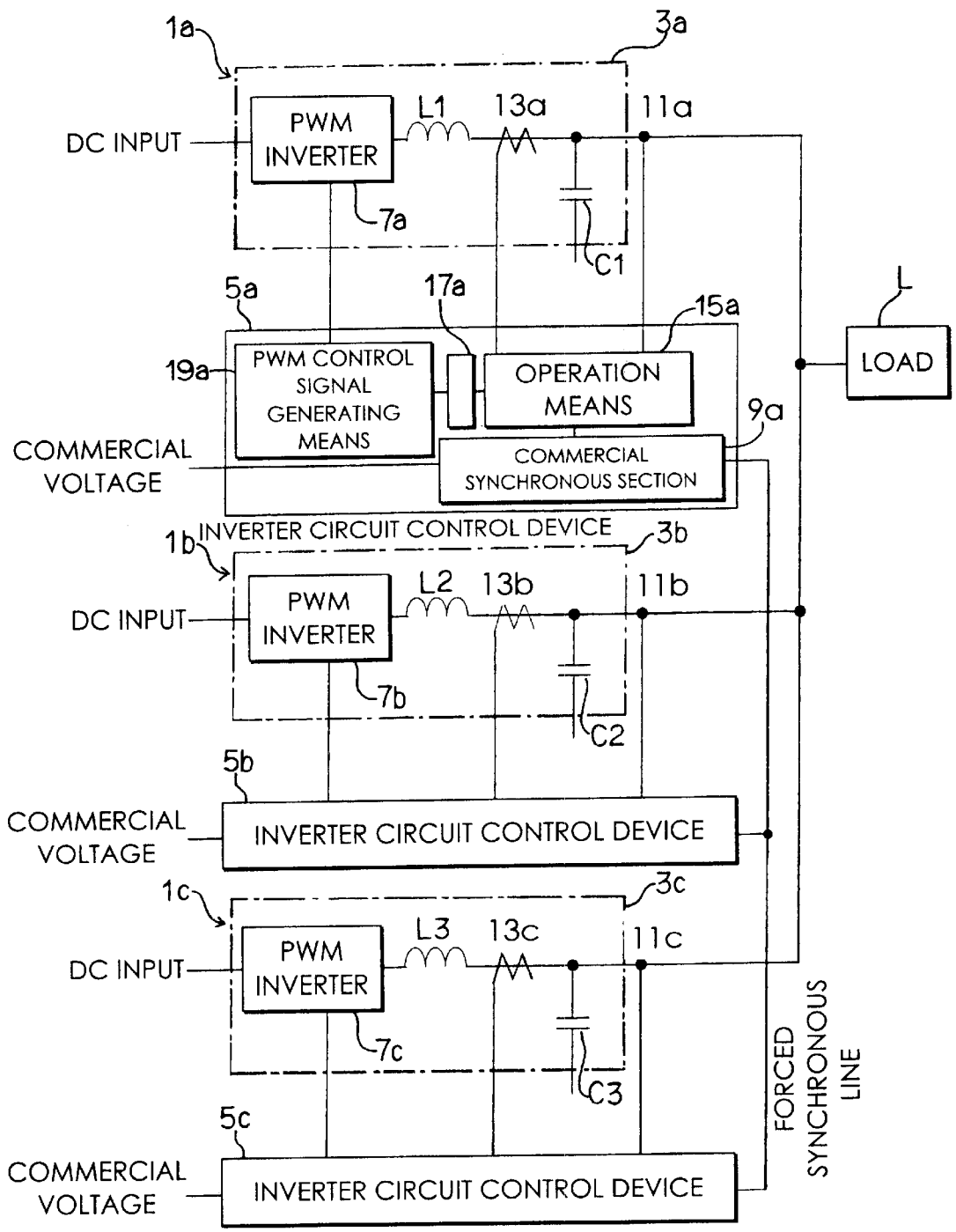
FIG. 1 is a block diagram showing an embodiment of a parallel operation-type uninterruptible power system (a parallel operation-type inverter system) according to the present invention.
Figure 2:
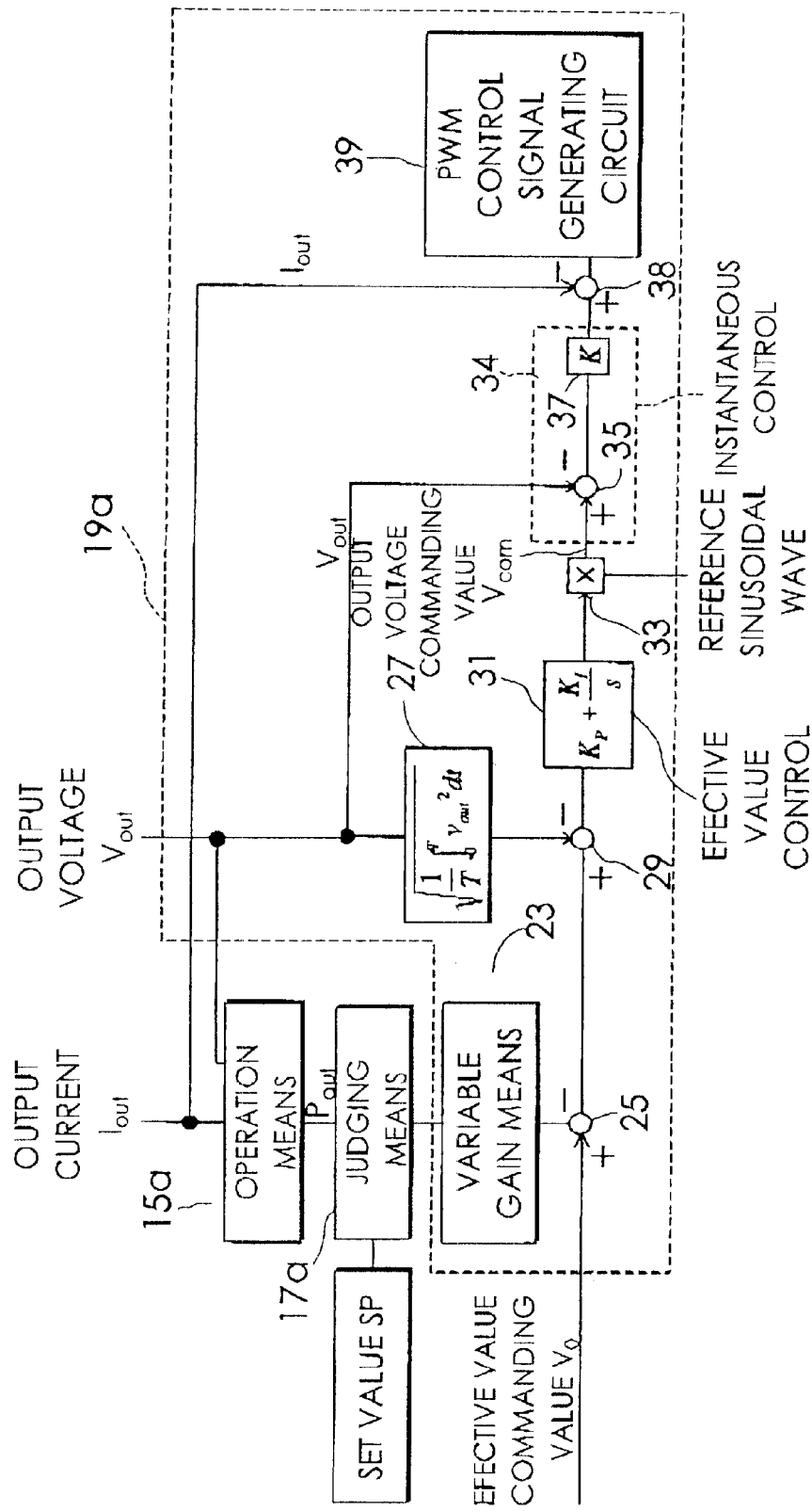
FIG. 2 is a block diagram showing an inverter circuit control device incorporated in the uninterruptible power system (inverter system) shown in FIG. 1.

Referring first to FIGS. 1 and 2, an embodiment of a parallel operation-type uninterruptible power system according to the present invention is illustrated, wherein FIG. 1 shows three uninterruptible power systems (including inverter) connected in parallel to each other and FIG. 2 shows an inverter circuit control device incorporated in each of the uninterruptible power systems. Uninterruptible power systems designated at reference characters 1a, 1b and 1c are constituted by inverter circuits 3a, 3b and 3c and inverter circuit control devices 5a, 5b and 5c, respectively. Three such uninterruptible power systems 1a, 1b and 1c each are connected at an output thereof to a common load L. Each of the inverter circuits 3a, 3b, 3c includes a PWM inverter 7a, 7b, 7c constituted by a plurality of semiconductor switching elements bridge-connected to each other and subjected to PWM control. Also, each of the inverter circuits 3a, 3b, 3c includes a reactor L1, L2, L3 and a capacitor C1, C2, C3 each connected in series to the PWM inverter 7a, 7b, 7c in order. The inverter circuits 3a, 3b and 3c are connected to the load L so as to be subjected to parallel operation with respect to the single load L. The inverter circuits 3a, 3b, 3c function to convert DC power fed from a DC power supply (not shown) into AC power to feed it to the load L, when a commercial power supply is in a normal condition as well. The DC power supply (not shown) includes a rectifying circuit for rectifying AC power of the commercial power supply and a storage battery charged with an output of the rectifying circuit. When power failure occurs in the commercial power supply, the inverter circuits 3a, 3b, 3c convert DC power fed from the storage battery of the DC power supply (not shown) into AC power to feed it to the load. Since the uninterruptible power systems 1a, 1b, 1c have a same construction. The construction of the inverter circuit control device 5a of the uninterruptible power system 1a is explained as follows.

The inverter circuit control device 5a includes a commercial synchronous section 9a, a voltage detecting means 11a for detecting an output voltage of the inverter circuit 3a, a current detecting means 13a for detecting an output current of the inverter circuit 3a, an operation means 15a for computing the value of an output power (supply active power) of the inverter circuit 3a, a judging means 17a, and a PWM control signal generating means 19a for preparing and generating a PWM control signal.

The operation means 15a computes a power value Pout of a supply active power being fed to the load L by the inverter circuit 3a on the basis of an output voltage value Vout of the inverter circuit 3a detected by the voltage detecting means 11a and an output current value Iout of the inverter circuit 3a detected by the current detecting means 13a and feeds it to the judging means 17a. In the illustrated embodiment, operation of the supply active power Pout in the operation means 15a is carried out using a current flowing to the reactor L1. Alternatively, it may be carried out using a current flowing to the capacitor C1. The judging means 17a judges whether the power value Pout of the supply active power fed from the inverter circuit 3a which is operated or computed by the operation means 15a has reached a value or level SP predetermined before or forward of an overload condition. The predetermined level SP means a power value which is judged to quite possibly cause the supply active power to fall into an overload condition. For example, when the value SP is considered from a viewpoint of a reduction ratio of the output voltage, it may be regarded as a power value or level at which the output voltage is reduced by 5% as compared with a rated voltage.

The PWM control signal generating means 19a functions to output a PWM control signal which commands to gradually reduce the output voltage Vout outputted from the inverter circuit 3a with an increase in supply active power Pout fed to the load L by the inverter circuit 3a until the judging means 17a judges that the value Pout of the supply active power has reached the predetermined level SP before or forward of the overload condition. Thus, such a condition or state causes the inverter 7a to be gradually increased in load sharing ratio. Then, the PWM control signal generating means 19a, when the judging means 17a judges that the value Pout of the supply active power has reached the predetermined level SP forward of the overload condition, feeds the inverter 7a of the inverter circuit 3a with a PWM control signal which takes command of reducing the output voltage Vout of the inverter circuit 3a at a larger reduction ratio to keep it from falling into the overload condition. This prevents the inverter 7a from being positively increased in load sharing ratio, resulting in a load sharing ratio of each of the remaining inverters being increased. It would be considered that such a condition causes a drift current. However, in the illustrated embodiment, the above-described drift current control techniques disclosed in Japanese Patent Publication No. 40704/1994 may be employed, resulting in the drift current being effectively controlled.

Figure 3:
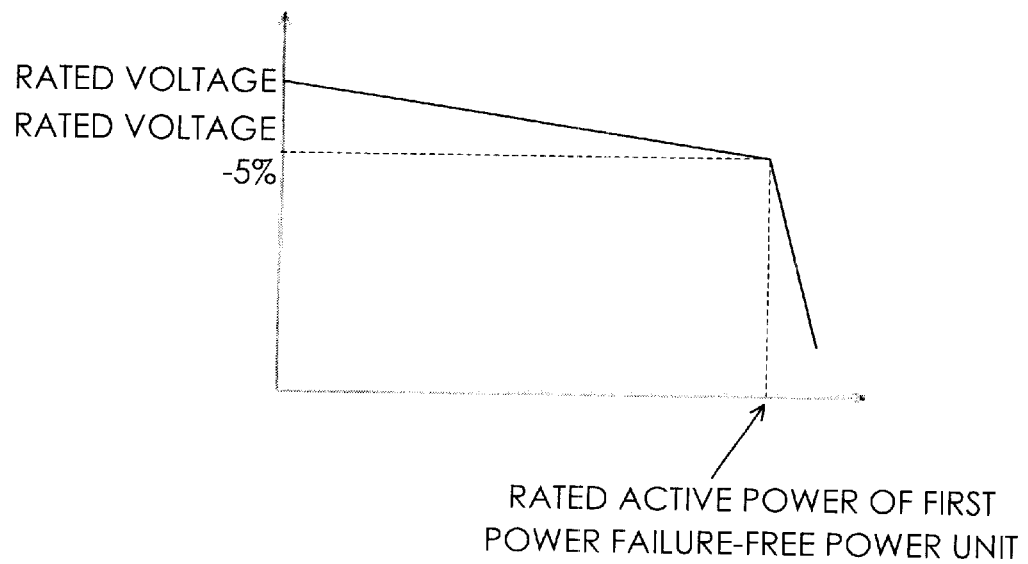
FIG. 3 is a graphical representation showing relationship between supply effective power and an output voltage in an uninterruptible power system of the present invention.

Now, construction of the inverter circuit control device 5a and operation thereof will be described more in detail with reference to FIGS. 2 and 3, wherein FIG. 2 shows the inverter circuit control device 5a more detailedly and FIG.

3 shows operation of the uninterruptible power system 1a. In FIG. 2, the output voltage Vout of the inverter circuit 3a detected by the voltage detecting means 11a and the output current Iout of the inverter circuit 3a detected by the current detecting means 13a are inputted to the operation means 15a, resulting in the output power Pout being computed on the basis of the output voltage Vout and output current Iout. Unless it is judged by the judging means 17a that the output power Pout computed by the operation means 15a has reached the predetermined power level (SP), a variable gain means 23 outputs a value (Pout×G1) obtained by multiplying the power value Pout of the supply active power operated or computed in the operation means 15a by a first gain constant G1 and feeds it to a summing point 25. The summing point 25 substracts the value (Pout×G1) from an effective value commanding value Vo (DC) of an output voltage to be obtained, to thereby output it. When the judging means 17a judges that the output power Pout computed by the operation means 15a has reached the predetermined power level, the variable gain means 23 outputs a value obtained by multiplying the output voltage Pout by a second gain constant G2 larger than the above-described gain constant G1 and feeds it to the summing point 25. Gain constant G1 and G2 are inverse numbers of electric current. Also, the output voltage Vout of the inverter circuit 3a is made into an effective value by an effective value forming means 27, which is then outputted from the effective value forming means 27. The effective value of the output voltage from the effective value forming means 27 is subtracted from the signal [Vo-Pout×G1 or G2] outputted from the summing point 25 and is outputted from the summing point 29. The output from the summing point 29 is a difference between an amended effective value commanding value and the output voltage Vout. The control is carried out in such a manner that the difference becomes zero. The difference is inputted into an effective value control means 31 and is amplified thereby. Then, an amplified differential signal outputted from the effective value control means 31 and a waveform of a sinusoidal wave (peak value is 1) are multiplied by each other to provide an output voltage commanding value Vcom. A deviation or difference between the output voltage commanding value Vcom and the output voltage Vout is multiplied by constant K in an instantaneous control means 37. The output current Iout is subtracted from the thus-increased deviation or difference at a summing point 38. Then, the subtracted value from the summing point 38 is inputted to the PWM control signal generating means 39. The PWM control signal generating means 39 outputs PWM control signal to PWM inverter 7a. In the illustrated embodiment, the instantaneous control means 37 and the summing point 35 arranged forwardly of the means 37 cooperate with each other to constitute the differential amplifying circuit 34. Also, in the illustrated embodiment, the above-described techniques disclosed in Japanese Patent Publication No. 40704/1994 may be employed to carry out addition or subtraction of the output current of the inverter circuit on an input side of the differential amplifying circuit. The techniques permit the output current Iout together with the output voltage Vout to be fed to the differential amplifying circuit 34, and also permit the output current to be subtracted from the reference sinusoidal wave. Thereby a drift current between the inverters may be effectively controlled.

Now, operation of reducing the output voltage with an increase in supply active power in the PWM control signal generating means 19a will be described with reference to FIG. 3. As described above, the judging means 17a has the predetermined voltage level (SP) set therein, which means a power value which is judged to quite possibly cause the supply active power to fall into the overload condition. For example, when the value SP is considered from a viewpoint of a reduction ratio of the output voltage, it may be regarded as a power value or level at which the output voltage is reduced by 5% as compared with a rated voltage such as, for example, 100 V or 200 V. Before the power value Pout computed by the operation means 15a reaches the predetermined level SP at which it falls into the overload condition, the output voltage is reduced at a first gradient or the first gain constant G1. Then, when it has reached the predetermined level SP, the output voltage Vout is substantially reduced at a second gradient larger than the first gradient or at the second gain constant G2 larger than the first gain constant G1.

Figure 4:
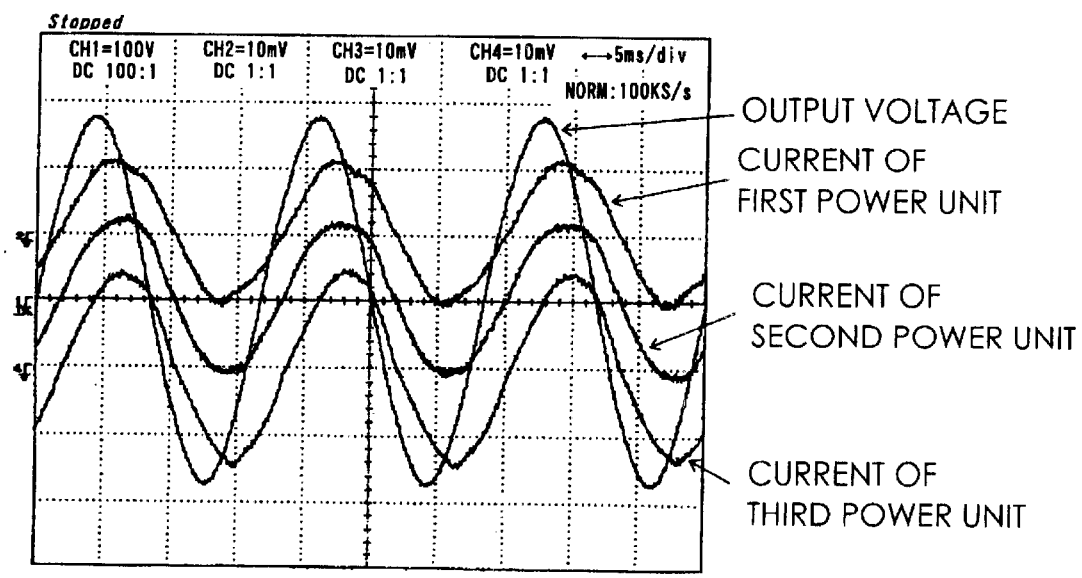
FIG. 4 is a graphical representation showing relationship between supply effective power and an output voltage in each of uninterruptible power systems of the present invention.

FIG. 4 is a graphical representation showing relationship between the output voltage Vout of the inverter circuit 3a and the output currents Iout of three such uninterruptible power systems 1a–1c connected in parallel to each other for operation. FIG. 4 indicates that the output current Iout of each of the uninterruptible power systems is satisfactorily shared with the output voltage Vout.

The illustrated embodiment is a case in which an inverter unit or parallel operation-type inverter unit is applied to both uninterruptible power system and parallel operation-type uninterruptible power system according to the present invention. However, it is a matter of course that the present invention may be effectively applied to other inverter units and a parallel operation-type inverter unit as well.

As can be seen form the foregoing, the present invention permits parallel operation of the plural uninterruptible power systems or inverter units to be carried out without requiring any circuit for associating the uninterruptible power systems or inverter units with each other while preventing the uninterruptible power systems or converter units from falling into an overload condition and permitting them to suitably share a load. Thus, the present invention permits any desired number of uninterruptible power systems or inverter units to be connected in parallel to each other for operation, to thereby facilitate designing of the parallel operation-type uninterruptible power system or parallel operation-type inverter unit and substantially reduce manufacturing costs thereof.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An uninterruptible power system comprising:
an inverter circuit for converting DC power converted from AC power of a commercial power supply into AC power to output it to a load when said commercial power supply is in a normal condition and converting DC power of a storage battery into AC power to output it to the load when said commercial power supply falls into a power failure condition;
said inverter circuit being constituted by semiconductor switching elements;
an inverter circuit control device including a voltage detecting means for detecting an output voltage of said inverter circuit, a current detecting means for detecting an output current of said inverter circuit, and a PWM control signal generating means for generating a PWM control signal for subjecting said semiconductor switching elements constituting said inverter circuit to PWM control to permit said inverter circuit to output said AC power synchronized with commercial power while adjusting an output voltage thereof;

said PWM control signal generating means including a differential amplifying circuit for amplifying a difference between said output voltage and a sinusoidal reference signal and being constructed so as to generate said PWM control signal depending on a signal obtained by adding or subtracting said output current to or from an input or output of said differential amplifying circuit in such a manner that said output current is subtracted from the sinusoidal reference signal;

said inverter circuit control device further including an operation means for operating a supply active power being fed to said load by the inverter circuit depending on said output voltage and output current and a judging means for judging whether said supply active power operated by said operation means has reached a predetermined level before it falls into an overload condition;

said PWM control signal generating means generating said PWM control signal so as to gradually reduce said supply active power or gradually reduce said output voltage of said inverter circuit as said supply active power increases and until said judging means judges that said supply active power has reached said predetermined level and so as to reduce said output voltage at a reduction ratio increased as compared with before to keep it from falling into said overload condition when said judging means judges that said supply active power has reached said predetermined level.

2. An uninterruptible power system as defined in claim 1, wherein said PWM control signal generating means is constructed so as to subtract a value obtained by multiplying said supply active power by a first gain constant from an effective value command value for an output voltage to be obtained before said judging means judges that said supply active power has reached said predetermined level and to subtract a value obtained by multiplying said supply active power by a second gain constant larger than said first gain constant from the effective value command value for the output voltage to be obtained when said judging means judges that said supply active power has reached said predetermined level.

3. A parallel operation-type uninterruptible power system comprising:

a plurality of uninterruptible power systems connected in parallel to a load;

said uninterruptible power systems each including:

an inverter circuit for converting DC power converted from AC power of a commercial power supply into AC power to output it to the load when said commercial power supply is in a normal condition and converting DC power of a storage battery into AC power to output it to the load when said commercial power supply falls into a power failure condition;

said inverter circuit being constituted by semiconductor switching elements; and an inverter circuit control device including a voltage detecting means for detecting an output voltage of said inverter circuit, a current detecting means for detecting an output current of said inverter circuit, and a PWM control signal generating means for generating a PWM control signal for subjecting said semiconductor switching elements constituting said inverter circuit to PWM control to permit said inverter circuit to output said AC power synchronized with commercial power supply while adjusting an output voltage thereof;

said PWM control signal generating means including a differential amplifying circuit for amplifying a difference between said output voltage and a sinusoidal reference signal and being constructed so as to generate said PWM control signal depending on a signal obtained by adding or subtracting said output current to or from an input or output of said differential amplifying circuit in such a manner that said output current is subtracted from the sinusoidal reference signal;

said inverter circuit control device further including an operation means for operating a supply active power being fed to said load by the inverter circuit depending on said output voltage and output current and a judging means for judging whether said active power operated by said operation means has reached a predetermined level before it falls into an overload condition;

said PWM control signal generating means generating said PWM control signal so as to gradually reduce said supply active power or gradually reduce said output voltage of said inverter circuit as said supply active power increases and until said judging means judges that said supply active power has reached said predetermined level and so as to reduce said output voltage at a reduction ratio increased as compared with before to keep it from falling into said overload condition when said judging means judges that said supply active power has reached said predetermined level.

4. An inverter circuit comprising:

an inverter circuit for converting AC power of a commercial power supply into DC power to output it to a load;

said inverter circuit being constituted by semiconductor switching elements; and an inverter circuit control device including a voltage detecting means for detecting an output voltage of said inverter circuit, a current detecting means for detecting an output current of said inverter circuit, and a PWM control signal generating means for generating a PWM control signal for subjecting said semiconductor switching elements constituting said inverter circuit to PWM control to permit said inverter circuit to output said AC power synchronized with commercial power supply while adjusting an output voltage thereof;

said PWM control signal generating means including a differential amplifying circuit for amplifying a difference between said output voltage and a sinusoidal reference signal and being constructed so as to generate said PWM control signal depending on a signal obtained by adding or subtracting said output current to or from an input or output of said differential amplifying circuit in such a manner that said output current is subtracted from the sinusoidal reference signal;

said inverter circuit control device further including an operation means for operating a supply active power being fed to said load by the inverter circuit depending on said output voltage and output current and a judging means for judging whether said active power operated by said operation means reaches a predetermined level before it falls into an overload condition;

said PWM control signal generating means generating said PWM control signal so as to gradually reduce said supply active power or gradually reduce said output voltage of said inverter circuit as said supply active power increases and until said judging means judges that said supply active power has reached said predetermined level and so as to reduce said output voltage at a reduction ratio increased as compared with before to keep it from falling into said overload condition when said judging means judges that said supply active power has reached said predetermined level.

5. A parallel operation-type inverter unit comprising:

a plurality of inverter units connected in parallel to a load;

said inverter units each including:

an inverter circuit for converting DC power converted from AC power into AC power to output it to a load;

said inverter circuit being constituted by semiconductor switching elements; and an inverter circuit control device including a voltage detecting means for detecting an output voltage of said inverter circuit, a current detecting means for detecting an output current of said inverter circuit, and a PWM control signal generating means for generating a PWM control signal for subjecting said semiconductor switching elements constituting said inverter circuit to PWM control to permit said inverter circuit to output said AC power synchronized with commercial power supply while adjusting an output voltage thereof;

said PWM control signal generating means including a differential amplifying circuit for amplifying a difference between said output voltage and a sinusoidal reference signal and being constructed so as to generate said PWM control signal depending on a signal obtained by adding or subtracting said output current to or from an input or output of said differential amplifying circuit in such a manner that said output current is subtracted from the sinusoidal reference signal;

said inverter circuit control device further including an operation means for operating a supply active power being fed to said load by the inverter circuit depending on said output voltage and output current and a judging means for judging whether said active power operated by said operation means has reached a predetermined level before it falls into an overload condition;

said PWM control signal generating means generating said PWM control signal so as to gradually reduce said output voltage of said inverter circuit as said supply active power increases and until said judging means judges that said supply active power has reached said predetermined level and so as to reduce said output voltage at a reduction ratio increased as compared with before to keep it from falling into said overload condition when said judging means judges that said supply active power has reached said predetermined level.

* * * * *